United States Patent [19]

Yanagi

[11] Patent Number: 5,228,019
[45] Date of Patent: Jul. 13, 1993

[54] METHOD AND APPARATUS FOR MEASURING SPEED OF MOVEMENT DURING BEAM TRACK MOVEMENT IN OPTICAL MEMORY APPARATUS

[75] Inventor: Shigenori Yanagi, Kawasaki, Japan

[73] Assignee: Fujitsu Limited, Kawasaki, Japan

[21] Appl. No.: 506,908

[22] Filed: Apr. 10, 1990

[30] Foreign Application Priority Data

Apr. 10, 1989 [JP] Japan .................. 1-090024

[51] Int. Cl.$^5$ .............................................. G11B 7/00
[52] U.S. Cl. .................................... 369/44.28; 369/32
[58] Field of Search ............... 369/32, 44.29, 44.28, 369/44.11, 44.26, 44.34, 50, 56; 360/73.01, 73.02, 73.08, 73.03

[56] References Cited

U.S. PATENT DOCUMENTS

| | | | |
|---|---|---|---|
| 4,593,386 | 6/1986 | Kuwabara et al. | 369/44.34 |
| 4,866,687 | 9/1989 | Kasai et al. | 369/32 |
| 4,899,325 | 2/1990 | Katsuhara et al. | 369/32 |
| 4,972,350 | 11/1990 | Sander et al. | 369/32 |
| 5,050,146 | 9/1991 | Richsels et al. | 369/32 |

Primary Examiner—Aristotelis Psitos
Assistant Examiner—Nabil Hindi
Attorney, Agent, or Firm—Staas & Halsey

[57] ABSTRACT

A method for measuring the speed of movement during beam track movement in an optical memory apparatus which moves a beam spot on a rotating optical recording medium, a beam spot is received from the optical recording medium and it is detected when the beam spot crosses a track. The number of the detected track crossings of the beam spot during a predetermined time are detected, and the interval of the detected track crossings is measured. The remainder time from the time when a track crossing is detected to the end of the predetermined time is counted, and the amount of movement of the beam spot in the predetermined time from the number of tracks counted, the time of the track crossing interval detected, and the remainder time detected, is measured.

8 Claims, 8 Drawing Sheets

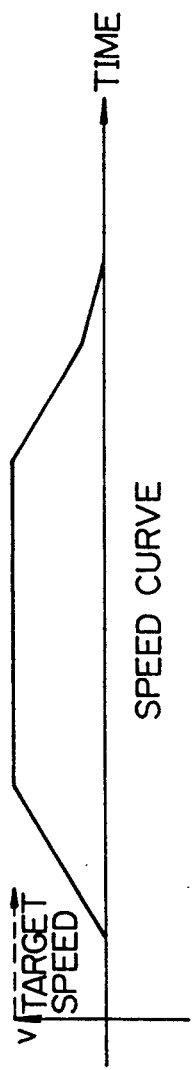
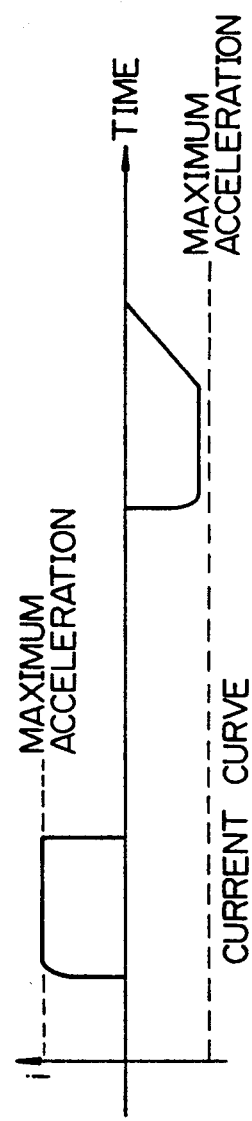

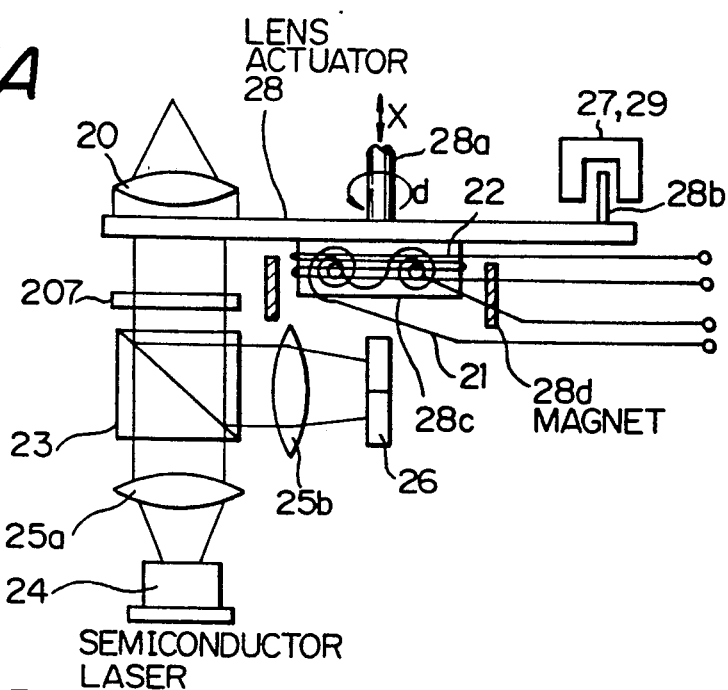
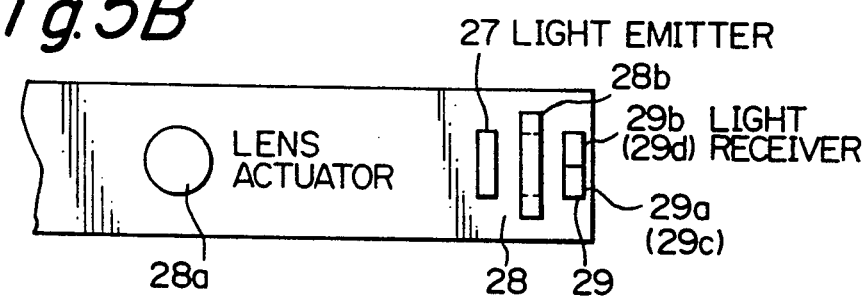
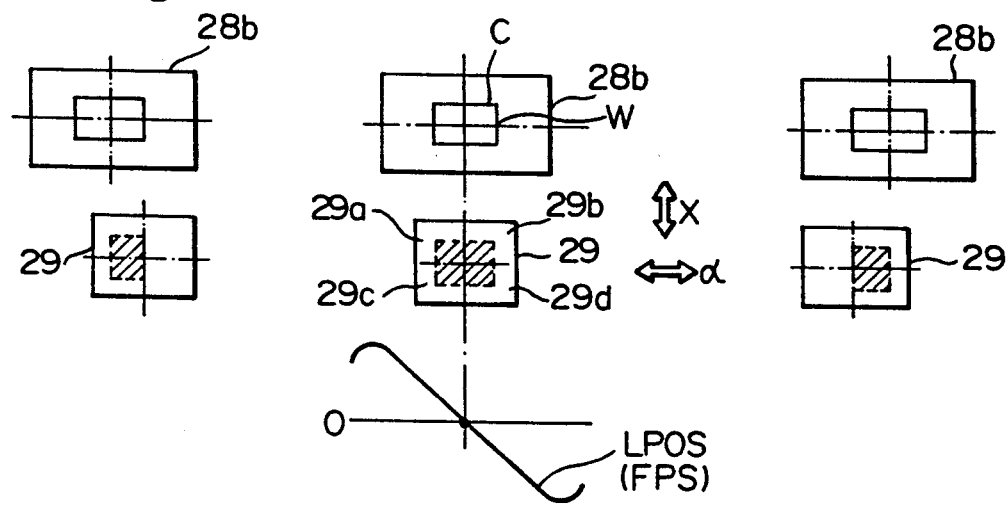

METHOD AND APPARATUS FOR MEASURING SPEED OF MOVEMENT DURING BEAM TRACK MOVEMENT IN OPTICAL MEMORY APPARATUS

CROSS REFERENCE TO RELATED APPLICATION

This application is related to applicant's U.S. patent application Ser. No. 07/236,915, which was filed Aug. 26, 1988 and is entitled TRACK SERVO CONTROL SYSTEM FOR OPTICAL DISK APPARATUS.

BACKGROUND OF THE INVENTION

1. Field of the Invention

The present invention relates to a method for measuring the speed of movement of a beam spot during track movement of the beam spot in an optical memory apparatus for large-scale computers, personal computers, and the like.

2. Description of the Related Art

An optical disk apparatus performs reading (reproduction) and writing (recording) with respect to an optical disk, rotated about a rotary shaft by a motor, by an optical head at a desired track by moving the optical head in the radial direction of the optical disk by a head drive motor.

The speed of movement of the optical head drive motor is controlled by how many tracks a beam spot is moved per unit time. That is, the amount of track movement of the optical beam spot per unit time is measured and the speed of movement of the optical beam spot with respect to the tracks is found from the amount of track movement. Next, the difference between the target speed predetermined in accordance with the remaining amount of tracks until the track to be accessed and the speed of movement is used as the speed error, the design deceleration model current, is added, and the current of the optical head drive motor is controlled.

During high speeds, the resolution is just right. However, at low speeds, the resolution with respect to a track is completely insufficient, so the speed cannot be measured in the same way as in high speeds.

SUMMARY OF THE INVENTION

Therefore, the object of the present invention is to provide a method and apparatus for accurately detecting the speed even at low speeds of the beam spot in a system for detection of the speed of movement of a beam spot by measuring the number of tracks over which a beam spot moves in a certain time interval.

In an optical memory apparatus which moves a beam spot on a rotating optical recording medium, the present invention is constituted by receiving a beam spot from the optical recording medium and detecting when the beam spot crosses a track, counting the number of the detected track crossings of the beam spot during a predetermined time, measuring the interval of the detected track crossings, counting the remainder time from the time when a track crossing is detected to the end of the predetermined time, and measuring the amount of movement of the beam spot in the predetermined time from the number of tracks counted, the time of the track crossing interval detected, and the remainder time detected.

According to the present invention, even when the beam spot is moving at a low speed, it is possible to obtain an excellent resolution of speed detection.

BRIEF EXPLANATION OF THE DRAWINGS

FIGS. 1A, 1B and 1C are diagrams explaining the related art,

FIGS. 5A, 5B and 5C are constitution views of the object lens of the optical head and a view for explaining a lens position signal.

DESCRIPTION OF THE PREFERRED EMBODIMENTS

Before describing the preferred embodiments, a more detailed explanation will be given of the related art for reference purposes.

Figure 1A:
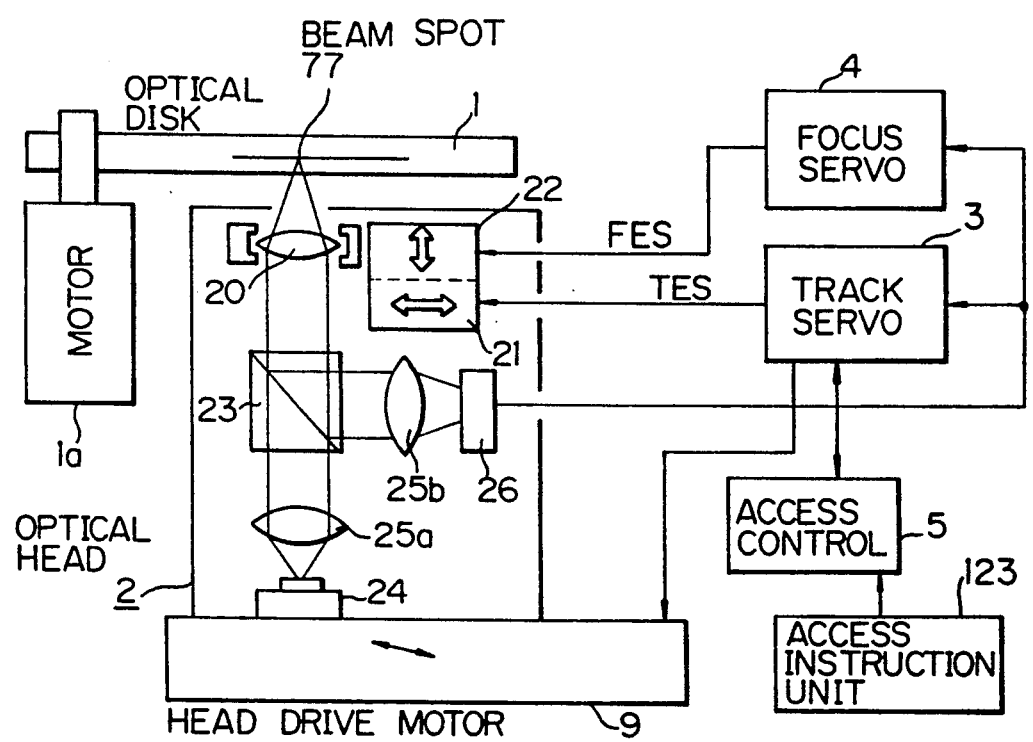

An optical disk apparatus, as shown in FIG. 1A, performs reading (reproduction) and writing (recording) with respect to an optical disk 1, rotating about a rotary shaft by a motor 1a, by an optical head 2 at a desired track by moving the optical head 2 in the radial direction of the optical disk 1 by a head drive motor 9.

In FIG. 1A, the beam spot is irradiated from a semiconductor laser 24 constituting a light source, is guided through a polarized beam splitter 23 and ¼ plate to an objective lens 20, and is focused to a beam spot 77 by the objective lens 20 and irradiated to the optical disk 1. The light reflected from the optical disk 1 is reflected through the objective lens 20 from the polarized beam splitter 23 and irradiated through the lens 25b to a four-divisional light receiver 26.

Now, in such an optical disk apparatus, a plurality of concentric or spiral shaped tracks are formed in the radial direction of the optical disk at intervals of several microns. As a result, eccentricity of the optical disk 1 causes deviations in position in the track direction. Also, warping of the optical disk 1 causes changes in the distance between the head 2 and the optical disk 1, causing deviations in the focal position of the beam spot. It is necessary to make a beam spot of under 1 micron size follow such deviations in the track direction and deviations in the focal position at a high speed.

Therefore, provision is made of a focus actuator (focus coil) 22 which changes the focal position by moving the objective lens 20 of the optical head 2 in the vertical direction in the figure and a lens actuator (track coil) 21 for moving the objective lens in the track direction of the optical disk 1.

Further, corresponding to these, provision is made of a focus servo unit 4 which prepares a focus error signal FES by a known method from the signal received by the light receiver 26 and drives the focus actuator 22 and a track servo unit 3 which prepares a track error signal TES from the signal received by the light receiver 26 by a known method at the same time and drives the lens actuator 21.

In an optical disk apparatus, when moving and positioning a beam spot 77, irradiated on an optical disk through an objective lens, to a predetermined track of the optical disk apparatus, the optical head 2 or the objective lens 20 was moved exactly several tracks to be moved to the target track. In general, this movement of tracks is referred to as "track jumping". To read data stored on the optical disk 1 or write data on the same, the beam spot 77 is moved to a predetermined track. The access to the predetermined track by the beam spot is performed by the lens actuator 21 and optical head drive motor 9.

The optical head drive motor 9 is for moving the optical head 2 to a predetermined position and moves the optical head 2 about the optical disk 1 and in the external direction. The optical head drive motor 9 is constituted by a usual voice coil motor (VCM). Therefore, the optical head drive motor 9 moves the optical head 2 so as to move the beam spot 77.

The optical head drive motor 9 moves the beam spot 77 at a predetermined target speed by the instruction of an access control unit 5.

The speed of movement of the optical head drive motor 9 is controlled by how many tracks the beam spot 77 is moved per unit time. That is, the amount of track movement of the beam spot 77 per unit time is measured and the speed of movement of the beam spot 77 with respect to the tracks is found from the amount of track movement. Next, the difference between the target speed predetermined in accordance with the remaining amount of tracks until the track to be accessed and the speed of movement is used as the speed error, the FEED FORWARD, i.e., the design deceleration model current, is added, and the VCM current of the optical head drive motor 9 is controlled.

For example, the unit time is set to 250 $\mu$s. The time is measured by a timer and the number of tracks of movement during the measurement is found from the track zero crossing signal TZCS obtained from the TES signal of the beam spot 77. A comparison is made of the target speed of movement set in advance in accordance with the number of tracks obtained by subtracting the number of tracks moved until the present from the number of tracks which have to be moved, that is, the remaining amount of track movement, and the speed of movement obtained from the number of tracks moved per unit time and the optical head drive motor 9 is decelerated or accelerated.

In a conventional optical disk apparatus, as shown in FIG. 1B, full acceleration is performed up to the target speed then the difference with the target speed based on the remaining number of tracks is controlled.

The seek speed is calculated as follows:

Assuming that the maximum speed (target speed) is produced by a number of tracks of seek operation of over ⅓ stroke (in the case of a 5 inch optical disk, the range of access is between R30 to R60 mm in the radial direction from the center of the optical disk. This range is referred to as the stroke. ⅓ stroke is a distance of about 10 mm in the radial direction of the optical disk), the relationship of the distance x and the time t is as follows:

$$x = \tfrac{1}{2} at^2 \text{ (a = degree of acceleration)}$$

where if $$x = 10 \text{ mm}/2 = 5 \times 10^{-2} \text{ m (}\tfrac{1}{3}\text{ stroke)}$$

$$t = 25 \text{ ms}/2 = (1.25 \times 10^{-2}) \text{ s (average seek time)}$$

then, $$a = (2 \times 5 \times 10^{-3})/(1/25^2 \times 10^{-4}) = 64 \text{ m/s}^2 = 6.53 \text{ G}$$

The speed v is $$v = at = 0.80 \text{ m/s} = 5.0 \times 10^5 \text{ TRK/S} = 500 \text{ kHz}$$

That is, the time for crossing one track is 2.00 $\mu$s.

The speed detection interval is 250 $\mu$s in the case of an ordinary magnetic disk apparatus (average seek time: 25 ms). This time is extremely important in terms of the seek stability. If the interval is over 300 $\mu$s, there will be variations in the fine servo jump-in speed at the end of the track jump, the settling time cannot be shortened, and the seek time will become longer.

Even in this optical disk apparatus, the VCM servo band is usually 200 Hz. In general, the band of the speed error signal has to be 10 times this servo band. Therefore, to secure a band of 2 kHz of the speed error signal, the speed detection time must be a minimum of 250 $\mu$s according to the sampling theorem.

An explanation will be made of the estimation of the maximum value of the end speed of the VCM speed control using one example.

The acceleration in the track direction of the objective lens on the optical head of the optical disk apparatus is 22 G/A. The coil resistance is 4.8$\Omega$. If a voltage of 9.6 V (in case of using a PWM drive circuit) is applied to the coil by the voltage loss of the drive stage, a deceleration pulse is output at the final ½ track. If the speed is made zero at the target track, the coil current i is $$i = 9.6/4.8 = 2 \text{ A}$$

The acceleration a is $$a = 22633\ 2 = 44 \text{ G} = 4.3 \times 3 \times 10^{-2} \text{ m/s}^2$$

Since the movement is stopped at the ½ track, $$x = 0.8 \ \mu\text{m} = 8 \times 10^{-7} \text{ m}$$

Therefore, the time t required for deceleration is $$t = \sqrt{(2 \times 8 \times 10^{-7})/(4.3 \times 10^2)} = 2.6 \times 10^{-5} \text{ s} = 61 \ \mu\text{s}$$

Further, the beam speed v at the time of the start of the deceleration is $$v = at = 4.3 \times 10^2 \times 6.1 \times 10^{-2} = 2.6 \times 10^4 = 61 \ \mu\text{s/TRK}$$

That is, the deceleration pulse is output and the seek operation ended at the −½ track position from a beam speed of 61 $\mu$s per track.

However, in an actual apparatus, there are variations in the entry speed due to eccentricity, speed error, etc.

Therefore, the speed found above is the maximum speed of entry. The target speed must be made smaller than this. Therefore, if the maximum speed of entry is made half of this, that is, 122 $\mu$s per track and the maximum speed is averaged out, the entry target speed is 91 $\mu$s per track.

However, a trial calculation is made as follows of to what degree the eccentricity will become.

If the zero peak of the eccentricity is A and the frequency of the rotation of the medium is f, the position x of the beam spot in the radial direction is $$x = A \sin(2\pi ft)$$

$$\dot{x} = A2\pi f \cos(2\pi ft)$$

$$\ddot{x} = -A4\pi^2 f^2 \cos(2\pi ft)$$

where, f = 90 l/s (5400 rpm)

A = 20 μm

Therefore, the maximum value of the speed is $$\dot{x}_{max} = A2\pi\omega = 1.1 \times 10^{-2} \text{ m/s}$$

The maximum value of the acceleration is $$\ddot{x}_{max} = A4\pi^2\omega^2 = 6.4 \text{ m/s}^2 = 0.65 \text{ G}$$

The final target speed during track entry found before is higher than the eccentricity speed, so it is possible to prevent track counting errors caused by eccentricity.

Next, an explanation will be made of the gist of the method for detecting speed by counting tracks performed for the speed control of the voice coil motor (VCM).

As the resolution of the measurement, 8 bits, that is, 1/256, is required.

Now, as mentioned above, the maximum speed during acceleration is about 2.0 μs per track. If the sampling time is the afore-mentioned 250 μs, the resolution with respect to one track is 1/125. If the zero cross point of the TES signal is made to correspond to the ½ track, the resolution becomes 1/250. Therefore, this matches the above-mentioned 8 bits and this resolution is enough.

In the above way, during high speeds, the resolution coincides with 8 bits and is just right.

However, at low speeds, i.e., at 91 μs per track, the resolution with respect to a track becomes 1/2.75. This is completely insufficient, so the speed cannot be measured in the same way as in high speeds. For example, as shown in FIG. 6B, the number of tracks is counted by the rising edge ($c_1$, $c_2$, $c_3$) of the track cross signal TZCS in the time of 250 μs ($T_1$). However, only the rising edges of the TZCS are counted. During the time $T_1$, there is included the time $x_s$ in which not only the tracks $s_1$, $s_2$, and $s_3$ but also the track one track before the track $s_1$ is moved. Further, it is not known if the beam spot 77 moves for the final track $s_3$ of the TZCS detected. That is, this is because the counting is performed by the rising edge of the TZCS. Therefore, at low speeds, the speed of movement over the tracks cannot be accurately detected.

It may be considered to read the TES signal of the optical disk by the A/D converter and measure not only the zero crossing signal of the TES, but also the amount of track movement from the phase of the TES signal. However, in the case of an optical disk, when the TES signal is read by the A/D converter, there is the effect of the ID (track address preformatted, etc.), so this means is not available.

In addition, there is the method of measuring the inversion time of the TES. This system measures the speed for each track from the zero crossing signal of the TES signal each time the beam spot 77 crosses a track. However, this system controls the speed by measuring the speed for each track, so the speed is measured by an MPU, but during high speed movement, the MPU must operate at a high speed. Therefore, a high speed MPU becomes necessary and the cost becomes high.

Therefore, consideration may be given to the system in which, at high speeds, speed control is performed by measuring how many tracks are moved for each interval of a certain time (250 μs) and when the speed of track movement becomes a low speed, the speed control is performed by measuring the speed for each track. In this system, however, it would be necessary to switch from a time based speed table to a remaining track based speed table for controlling the speed. That is, a number of types of speed tables would become necessary and, further switching control would become necessary. Therefore, the control and hardware would both become complicated.

Figure 2A:
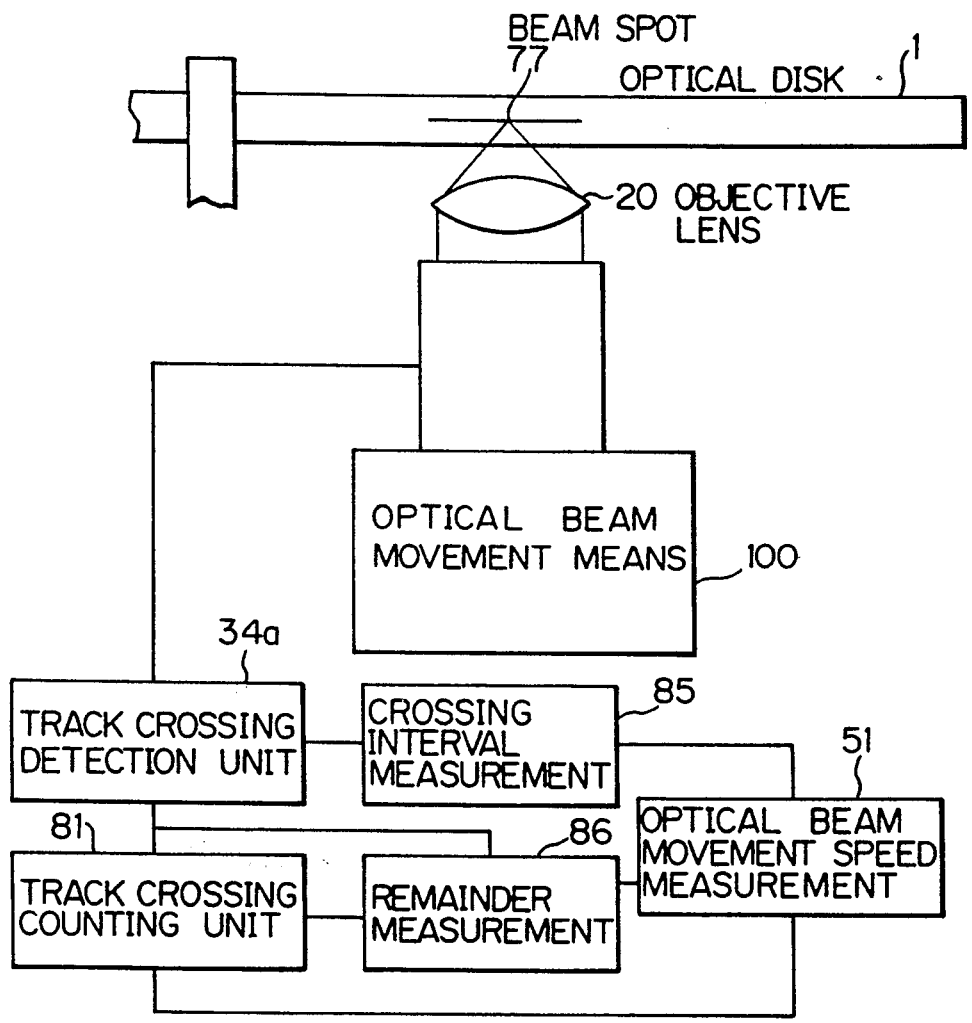
FIGS. 2A and 2B are diagrams explaining the principle of the present invention.

FIG. 2A is a diagram of the principle of the present invention. Reference numeral 1 is a rotating optical recording medium, 77 is a beam spot, 100 is an optical beam movement means which moves the beam spot 77, 34a is a track crossing detection means which receives the beam spot from the optical recording medium 1 and detects when the optical beam spot crosses a track, 81 is a track crossing counting means which counts the number of track crossings of the optical beam spot detected by the track crossing detection means 34a during a predetermined time set in advance, 85 is a track crossing interval measurement means which measures the time of the interval of track crossings detected by the track crossing detection means 34a, 86 is a remainder measurement means which measures the time from when a track crossing is detected by the track crossing detection means 34a until the end of the predetermined time, and 51 is an optical beam movement speed measurement means which measures the number of tracks over which a beam spot moves in the predetermined time from the number of tracks counted by the track crossing counting means 81, the time measured by the track crossing interval measurement means 85, and the time measured by the remainder measurement means 86.

Figure 2B:
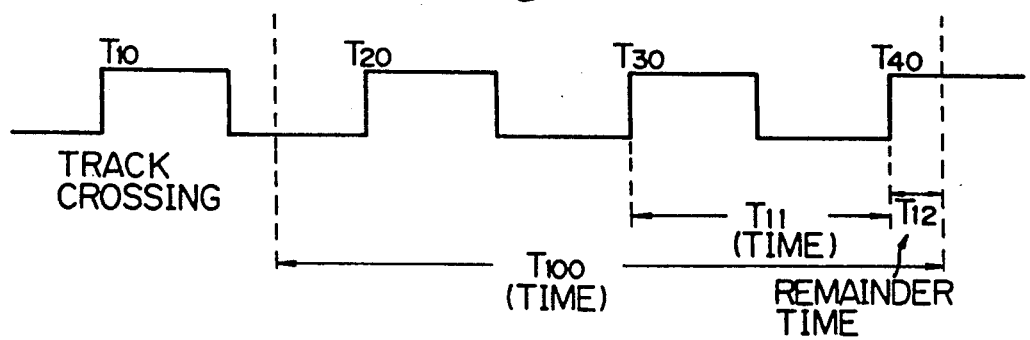

The track crossing detection means 34a detects when the optical beam spot 77 crosses a track of the optical recording medium 1 ($T_{10}$, $T_{20}$, $T_{30}$, $T_{40}$ of FIG. 2B represent the same). The track counting means 81 counts the number of track crossings (assumed to be n) during a predetermined time $T_{100}$ set in advance. The track crossing interval measurement means 85 measures the time $T_{11}$ by which the beam spot crosses one track. Further the remainder measurement means 86 measures the time $T_{12}$ from the track crossing to the predetermined time. The above-mentioned n, $T_{11}$, and $T_{12}$ and $T_{11}'$ and $T_{12}'$ found from the predetermined time $T_{100}'$ one time before the predetermined time are used to find the number of tracks moved during the above-mentioned predetermined time $T_{100}$ and the remainder too.

Figure 3A:
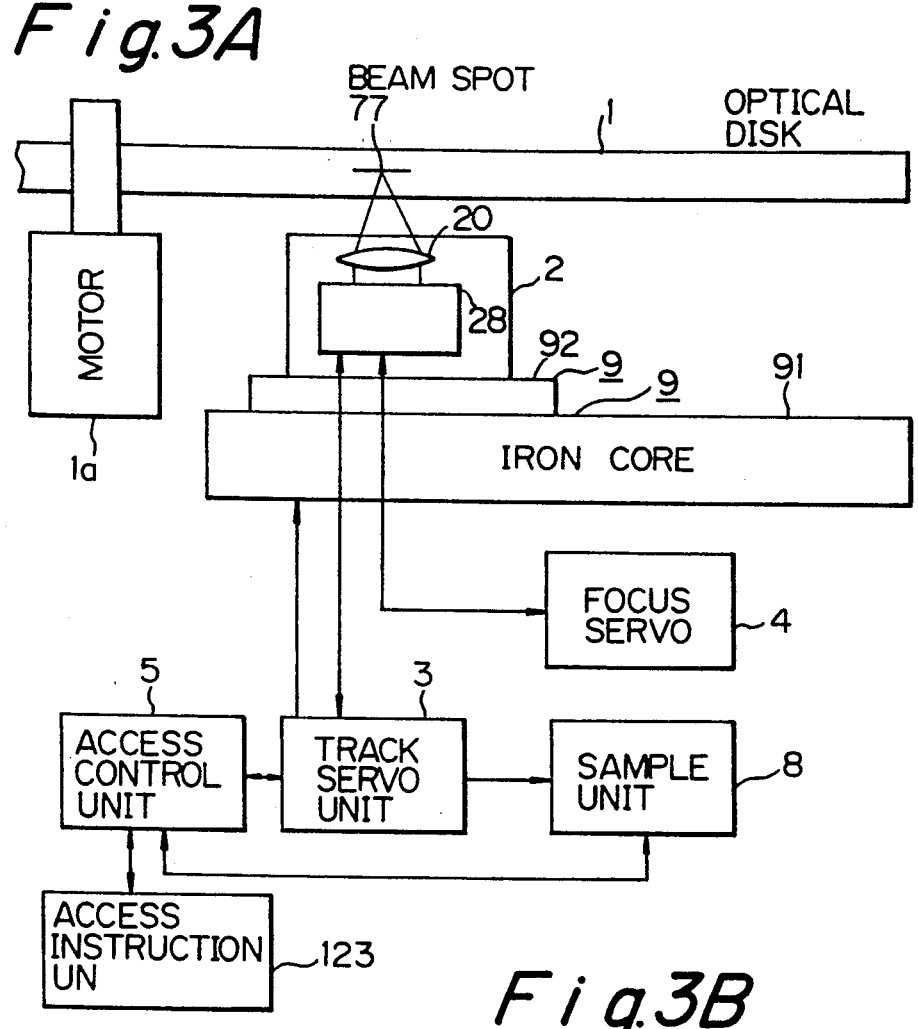
FIG. 3A is a block diagram of an embodiment of the present invention.
Figure 3B:
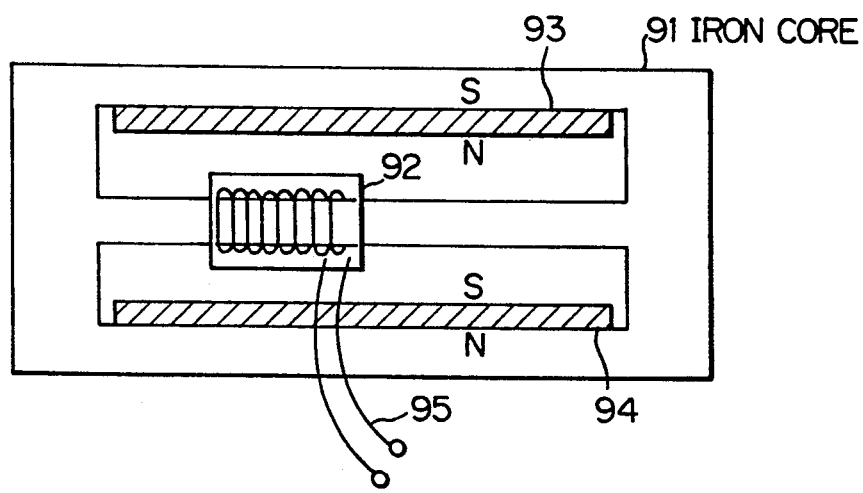
FIG. 3B is a constitutional view of a voice coil motor which moves the optical head, FIGS. 4A and 4B formed block diagrams for explaining the circuit for controlling the movement of the optical beam spot.
Figure 4A:
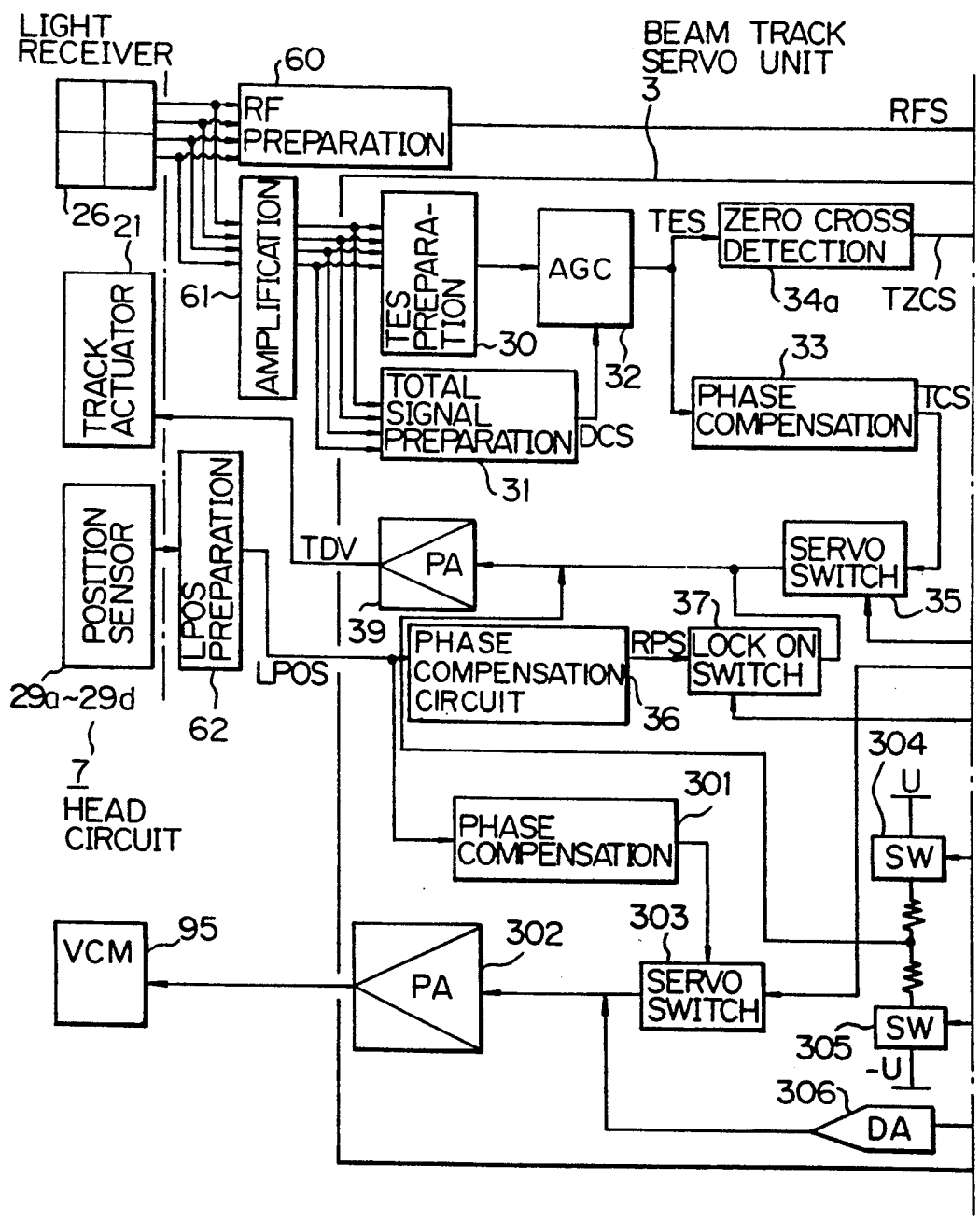
Figure 4B:
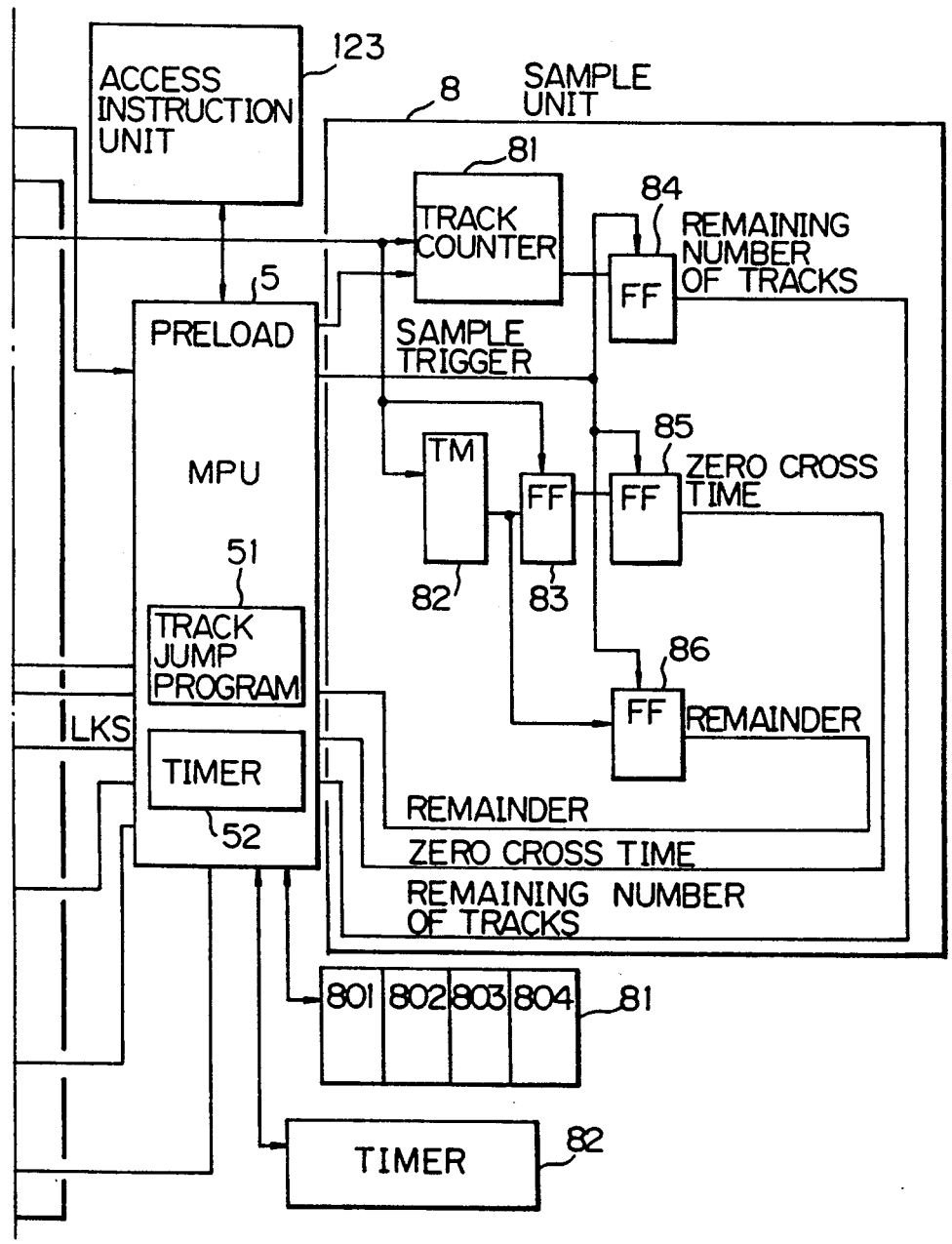

FIG. 3A is a block diagram of an embodiment of the present invention, FIG. 3B is a constitutional view of the voice coil motor for moving the optical head, FIG. 4 is an explanatory view of the circuit for controlling the movement of the optical beam spot, and FIGS. 5A to 5C are constitutional views of the objective lens of the optical head.

First, an explanation will be made of the constitution of the optical head using FIGS. 5A to 5C. In FIG. 5A, a semiconductor laser 24 outputs a beam. The light of the semiconductor laser 24 is made by a collimator lens 25a into parallel light, which passes through a polarized beam splitter 23 and ¼ λ plate 207 and is focused into a beam spot 77 on the optical disk 1 by an objective lens 20. The light reflected from the optical disk 1 is incident on the objective lens 20, ¼ λ plate 207, and polarized beam splitter 23, then is incident to the four-divisional light receiver 26 by a collecting lens 25b.

The objective lens 20 is provided at one end of a lens actuator body 28 which can rotate about a rotary shaft 28a. At the other end is provided a fixed slit 28b.

A coil unit 28c of the lens actuator body 28 is provided, around which coil unit 22 is provided a focus coil and at the side of the same a whirlpool shaped lens actuator coil 21. Around the coil unit 28c is provided a magnet 28d.

Therefore, when current flows to the focus coil 22, the lens actuator 28 carrying the objective lens 20 moves up or down in the x axial direction of the figure in the same way as the voice coil motor, whereby the focal position can be changed. When current flows to the lens actuator coil 21, the lens actuator 28 rotates in the α direction about the rotary shaft 28a, whereby the position in the track direction can be changed.

A light emitter 27 and light receiver 29 constituting a position sensor are provided with respect to the fixed slit 28b provided at the end of the lens actuator 28. As shown in FIGS. 5A and 5B, the light emitter 27 and four-divisional light receivers 29a to 29d are provided facing each other over the fixed slit 28b.

At the fixed slit 28b is provided a window W. Light of the light emitter 27 passes through the window W and is received by the four-divisional light receivers 29a to 29d.

Therefore, as shown in FIG. 5C, the distribution of light reception of the four-divisional light receivers 29a to 29d changes in accordance with the amount of movement in the α and x directions of the lens actuator 28. Therefore, the track direction lens position signal LPOS and the position signal EFPS of the focus signal can be found as follows from the outputs A, B, C, and D of the four-divisional light receivers 29a to 29d:

$$LPOS = (A+C) - (B+D)$$

$$FPS = (A+B) - (C+D)$$

These LPOS and FPS, as shown in FIG. 5C, become S shaped signals deviated from the center position and with a center position at zero. Using these signals, it is possible to impart an electrical spring force to the direction of the center position.

Next, an explanation will be made of the optical head drive motor for moving the optical head using FIG. 3. The motor is constituted by a voice coil motor.

The voice coil motor, as shown in FIG. 3B, has three spaces at its iron core 91. A coil 95 is wound around the iron core extending over the three spaces. The coil 95 is fixed in place by a coil portion 92. Reference numeral 93 is a magnet with magnetic poles as illustrated. Therefore, by passing a predetermined current through the coil 95, the coil portion moves to the left and right in the figure. As shown in FIG. 3A, the coil portion 92 of the voice coil motor is provided with an optical head 2, which optical head 2 is provided with a lens actuator 28 which controls the objective lens 20 explained in FIG. 4. Therefore, by passing a current to the coil 9, the optical head 2 is moved.

An explanation will be made now of the track servo unit 3 using FIG. 4. Reference numeral 7 is a head circuit unit, which has an RF preparation circuit 60 which prepares an RF signal RFS from the four-divisional light receiver 26 of the beam spot, an amplifier 61 which amplifies the outputs A to D of the four-divisional light receiver 26 and outputs the servo outputs SVA to SVD, and an LPOS preparation circuit 62 which prepares a lens position signal LPOS of an objective lens which irradiates a beam from the outputs A to D of the four-divisional light receivers 29a to 29d of the position sensor. The RF preparation circuit 60 prepares an RF signal (RFS) from the four-divisional light receiver 26, which signal is used for reading the track addresses preformatted on the optical disk.

Reference numeral 30 of the beam track servo unit 3 is a beam TES (track error signal) preparation circuit which prepares a track error signal TES from the servo outputs SVA to SVD of the amplifier 61. Reference numeral 31 is a total signal preparation circuit which adds the servo outputs SVA to SVD and prepares a total signal DSC of the total reflection level, and 32 is an AGC (automatic gain control) circuit which divides the track error signal TES by the total signal (total reflection level) DSC and performs AGC using the total reflection level as the reference value. It corrects fluctuations of the irradiation beam intensity or reflectance.

Reference numeral 33 is a phase compensation circuit which differentiates the track error signal TES given a gain, adds the proportional portion of the track error signal TES, and advances the phase.

Reference numeral 35 is a servo switch which closes with the servo on signal SVS of the MPU 5 to close the servo loop and opens with the off signal to open the servo loop.

Reference numeral 34a is a zero crossing detection circuit which detects the zero crossing point of the track error signal TES and outputs the track crossing point signal TZCS to the MPU 5, and 36 is a phase compensation circuit which prepares a return signal RPS which generates a return force in the track direction heading toward the center position of the lens actuator 28 of FIG. 5A from the LPOS preparation circuit 62.

Reference numeral 37 is a lock on switch which closes with the on state of the lock on signal LKS of the MPU 5 to guide the return signal RPS to the servo loop and opens with the off state to cut the introduction of the return signal RPS to the servo loop, and 39 is a power amplifier which amplifies the output of the return signal preparation circuit 36 and gives a track drive current TDV to the lens actuator coil 21.

The phase compensation circuit 301 differentiates the output of the LPOS signal preparation circuit 62, adds the proportional component, and advances the phase. Reference numeral 302 is a power amplifier which amplifies the output of the phase compensation circuit 301, outputs to the coil 95 of the optical head drive motor, and drives the coil 95. Reference numeral 303 is a servo switch which closes with the servo on signal SVS of the MPU 5 to close the servo loop and opens with the off signal to open the servo loop. Reference numeral 306 is a digital to analog converter which converts the output of the MPU 5 to an analog wave and adds it to the power amplifier 302.

Next, an explanation will be made of the sample unit 8. Reference numeral 81 is a track counter which counts the riding edges of the TZCS output from the zero crossing detection circuit 34a. The counter subtracts 1 from the number preloaded by the MPU 5 each time the TZCS is detected. Reference numerals 83, 84, 85, and 86 are flip-flop circuits. The flip-flop circuits store and output to the MPU 5 the values input by the sampling trigger signals output from the MPU 5.

Reference numeral 82 is a timer which starts the count with the rising edge of the TZCS signal and stops the count simultaneously with the stopping of the output of the TZCS signal.

Reference numeral 81 is a table constituted by a ROM. In 801 of the ROM is stored the target speed for acceleration, in 802 the target speed for the remaining number of tracks, in 803 the feed forward current for the remaining number of tracks, and in 804 the remaining number of tracks and addresses corresponding to the above mentioned three reference table positions. Reference numeral 82 is a RAM.

The MPU 5 starts up the track jump program 51. Further, it has a timer 52. The timer 52 counts 250 μs. Reference numeral 123 is an access command unit, a host unit of the MPU 5, which indicates the track address to be accessed to the MPU 5.

Figure 6A:
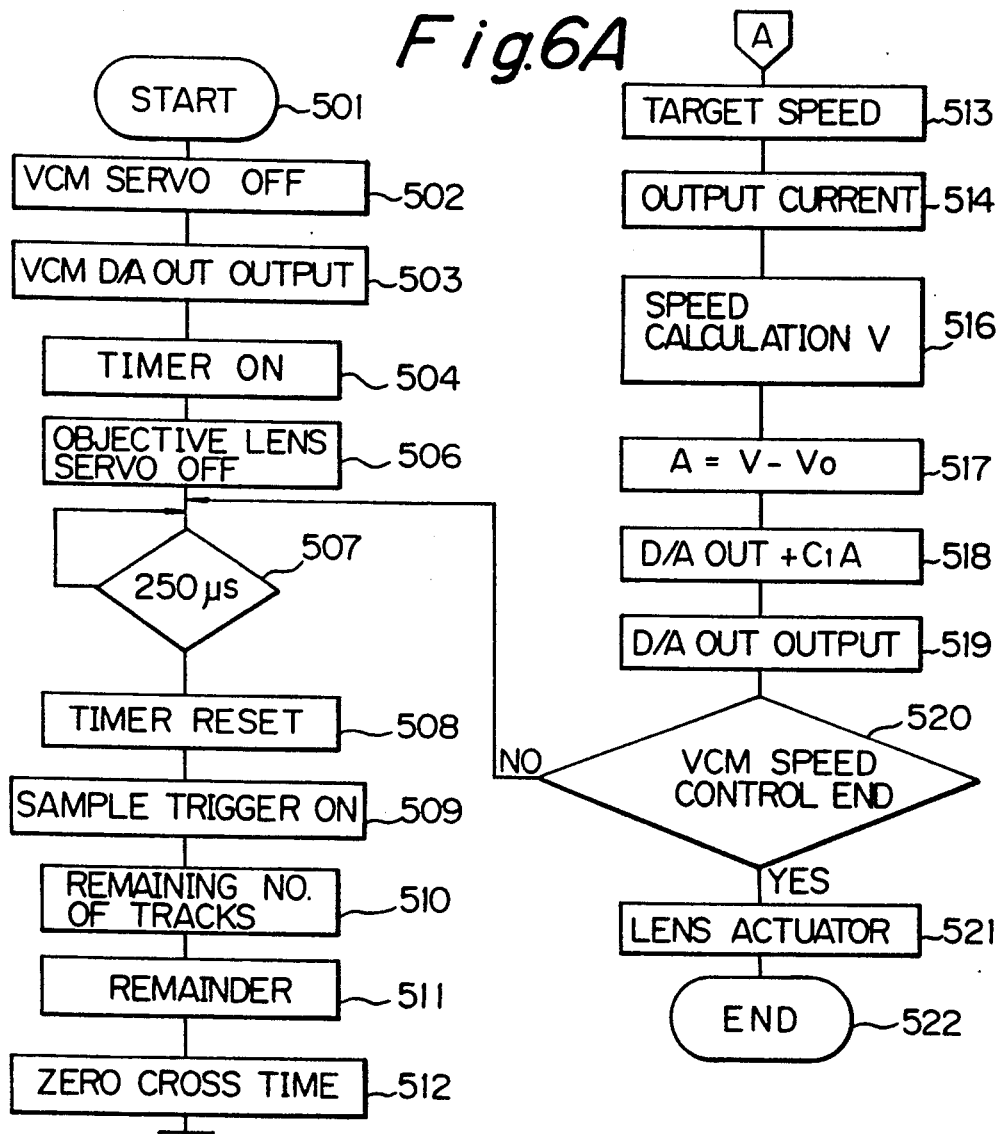
FIGS. 6A and 6B are a flow chart and a timing chart of a TZC signal.
Figure 6B:
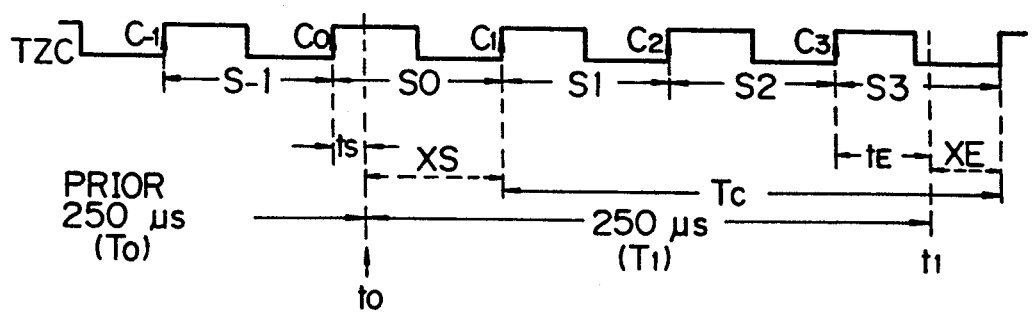

FIG. 6A is a flow chart of the processing of the track jump program 51 of an embodiment of the present invention. FIG. 6B is an explanatory view of the TZCS signal for explaining the operation.

First, referring to FIG. 4, the operation of the track servo unit 3 will be explained. The light beam of the semiconductor laser 24 is irradiated on the optical disk 1, then incident to the four-divisional light receiver 26. The signals SVA to SVD are amplified by the amplifier 61 and input to the TES signal preparation circuit 30 of the track servo unit 3, and the track error signal TES is prepared from SVA to SVD. The total signal preparation circuit 31 adds together the servo outputs SVA to SVD and prepares the total signal DSC of the total reflection level.

Next, the AGC circuit 32 divides the track error signal TES by the total signal (total reflection level) DSC and performs AGC using the total reflection level as the reference value so as to correct fluctuations in the irradiated beam intensity and reflectance. The phase compensation circuit 33a differentiates the track error signal TES given a gain and adds the proportional component of the track error signal TES. The servo switch 35 is usually on. The signal is amplified by the power amplifier 39, and the output of the power amplifier is input to the lens actuator coil 21, whereby the track position of the beam spot is controlled.

The track servo control by the return signal RPS is used when bringing the optical head 2 near the target track by the optical head drive motor 91. During the movement of the optical head 2, the MPU 5 leaves the servo on signal SVS in the off stage and turns on the lock on signal LKS. Therefore, no servo loop is formed by the track error signal TES, but the lens actuator coil 21 is controlled to be locked by the lens position signal LPOS by the outputs A to D of the position sensors 29a to d. That is, the lens actuator coil 21 is driven by the power amplifier 39 by the return signal RPS of the return signal preparation circuit 39, and the lens actuator 29 is controlled to return to the center position and be fixed there.

The lens actuator 28, that is, the objective lens 20, is locked in this way to ensure that the lens actuator 28 does not move in the head due to vibration during movement of the optical head 2 and to thus prevent damage etc. Electrical locking is performed by the lens position signal LPOS.

Further, in the servo pull-in just after the servo on signal SVS is turned on after the end of the movement of the optical head 2, the lock on signal is left in the on state and a return force is given to the center position of FIG. 5C by the return signal RPS while the tracking is controlled by the track error signal TES.

Therefore, for a track of an eccentric optical disk 1, the servo pull-in to the track is performed at the point of the least amount of movement in the radial direction (direction crossing the track) and thus a stable start of pull-in becomes possible.

The lens position signal prepared by the LPOS preparation circuit is input through the phase compensation circuit 301 to the power amplifier 302 and drives the VCM coil 95. Therefore, during tracking, the track actuator 21 is driven by the TES signal, the optical head drive motor 9 is driven by the lens position signal prepared by the position sensors 29a to d of the lens actuator at that time, and the optical head 2 is moved, whereby two types of servo operations are realized.

Below, an explanation will be made of the operation during a track jump according to an embodiment of the present invention.

First, the operation will be explained in brief.

(1) Acceleration

A difference (number of tracks to be moved) is set in the track counter 81.

(2) The servo of the voice coil motor is turned off (the servo switch 303 is turned off) and an acceleration current is output to the D/A converter 306 which determines the drive current of the VCM coil 95.

(3) After a little time, the track servo of the track actuator 21 is turned off (servo switch 35 is turned off).

(4) Acceleration is performed until the target speed is reached.

(5) Deceleration

The difference from the target speed based on the remaining number of tracks is used as the speed error, the feed forward current based on the remaining number of tracks is applied, and the result is output to the D/A converter 306.

(6) After the VCM speed control ends, a lens seek operation is performed on the lens actuator until the target track.

Below, an explanation will be made in accordance with the flow chart of FIG. 6A of the embodiment. The track jump program 51 starts by the MPU 5 and controls the movement of the beam spot 77 during the track jump.

Step 501

The access instruction unit 123 informs the MPU 5 of the track to be accessed by the optical beam spot 77. By this, the MPU 5 obtains the number of tracks until the track to be accessed from the track at which the optical beam spot is currently positioned. The number of tracks is loaded in the track counter 81.

Step 502

The servo control of the optical head drive motor 9, that is, the VCM coil 95, is turned off. The servo control is turned off by sending a signal to the servo switch 303.

Step 503

The MPU 5 reads the current for acceleration from a table 802 storing the feed forward current for acceleration stored in the above-mentioned ROM 81 and outputs the pulse of that value to the D/A converter 306. Therefore, acceleration is performed. Refer to FIG. 6B.

The beam spot moves over the track by the above-mentioned acceleration. Therefore, the track counter 81 subtracts the loaded value by the rising edge $c_1$ of the TZCS signal output from the zero cross signal detector 34a. The decremented value is output to a flip-flop circuit 84. The flip-flop circuit 84 stores the remaining number of tracks.

The TZCS signal $c_1$ is input to the timer 82, and a new count is begun each time the zero cross is detected ($c_1$, $c_2$, $c_3$). The count value is continuously input to the flip-flop circuit 83. The TZCS signal is also input to the flip-flop circuit 83. Each time the TZCS signal is input, the value of the timer 82 is stored. That is, flip-flop 83 stores the zero cross interval, that is, the time by which the beam spot moves one track.

The value measured by the timer 82 is output also to the flip-flop 86.

Step 504
The MPU 5 turns on the timer 52 in the MPU 5. The timer 52 counts 250 μs.

Step 506
After a predetermined time (within 250 μs) passes from the timer turning on, the servo control of the objective lens actuator 21 is turned off. The servo control is turned off by turning off the servo switch 37. Further, at the same time as the servo control is turned off, the LKS signal is output, the lock on switch is turned on, and the objective lens 20 is electrically locked by the lens position signal LPOS. The servo control is turned off after a predetermined time passes to prevent errors in the counting due to eccentricity.

Step 507
It is judged if the timer 52 has counted 250 μs.

Step 508
The timer is reset. The timer 52 again counts 250 μs.

Step 509
At the same time as the timer is reset, the sample trigger signal is turned on.

Therefore, the respective input values are stored in the flip-flops 84, 85, and 86.

Refer to FIG. 6B. The sample trigger signal is turned on at $t_1$.

In the flip-flop 84 is stored the remaining number of tracks which the beam spot should move until the time $t_1$ when the sample trigger signal is turned on. In the flip-flop 85 is stored the interval from the zero cross signal $c_2$ to $c_3$, that is, the time $s_2$, since there is the flip-flop 83. Further, in the flip-flop 86 is stored the time tE from the rising edge $c_3$ of the TZCS signal to $t_1$.

Step 510
The MPU 5 reads the remaining number of tracks from the flip-flop circuit 84.

Step 511
tE is read from the flip-flop 86 and stored in the RAM 82.

Step 512
$s_2$, that is, the zero cross time, is read from the flip-flop 85 and stored in the RAM 82.

Step 513
The target speed $V_0$ for the remaining number of tracks stored in advance is read from the table 802 from the remaining number of tracks.

Step 514
The feed forward current i for the remaining number of tracks stored in advance is read from the table 803 from the remaining number of tracks.

Step 516
The remainder of the track position is calculated referring to the zero cross inversion interval of the trigger error signal during measurement by the timer measuring that value at the sampling timing and the zero cross inversion interval of one time before.

Here (refer to FIG. 6B), if the number of track crossings of the sample time $T_0$ is made T, then the change of the track counter is made $T_c$ (3), $$(s_0 - t_S)/s_0 = X_S \quad (1)$$

$$(s_3 - t_E)/s_3 = X_E \quad (2)$$

$$T_S = X_S - X_E \quad (3)$$

$$T = T_C + T_S \quad (4)$$

Therefore, the amount of track movement during the sampling time is expressed by $T = T_C + T_S$ including the remainder.

Further, the change of the TES zero cross signal during movement by the VCM at a certain acceleration is as follows:

Assuming an acceleration of the optical head drive motor 9 (VCM) a (m/s²),
a time of crossing one track t (s),
a track pitch (m), and
a beam speed v = p/t (m/s), then the beam acceleration changing for each track is at (m/s)

and the rate of change of the speed for each track is at/v = at/(p/t) = at²p therefore, $$s_0 = s_{-1}(1 + (at^2/p))$$

$$s_3 = s_2(1 + (a't'^2/p)).$$

The time for crossing one track t,t', that is, t, may be found from the table 802 as the target speed for the remaining number of tracks.

Further, the acceleration a, a' may be found from table 303 as the feed forward current for the remaining number of tracks (the current is proportional to the acceleration).

Substituting the above two equations in equations (1) to (4), $$T = T_C + T_S$$

$$T = T_C + (s_0 - t_S)/s_0 - (s_3 - t_E)/s_3$$

$$T = T_C + (s_{-1}(1 + (at^2/p)) - t_S)/(s_{-1}(1 + (at^2/p))) -$$

$$(s_2(1 + (a't'^2/p)) - t_E)/(s_2(1 + (a't'^2/p)))$$

and the number of tracks at the sampling time $T_0$ is found.

The above $s_2, \ldots t_E$ are values sampled at the time $t_1$ by the sample trigger signal. Further, $s_{-1}$ and $t_S$ are values sampled at the sample time $t_0$ of one time before and are obtained by reading the values stored in the RAM at the steps 511 and 512. t, t', a, and a' are found by referring to the table.

Therefore, the accurate number of tracks of movement is found and the accurate speed V is found.

Step 517

Now, from the speed V and the target speed $V_0$ obtained from the table at the step 513, $$A = V - V_0$$

is found.

Step 518

The constant $C_1$ is applied to the above A and the result is used as the output for the D/A converter 306.

$$D/A_{out} = C_1 A$$

Step 519

Then $D/A_{out} = C_1 A$ is output to the D/A converter 306. Therefore, the optical head drive motor 9 is accelerated or decelerated in accordance with the output.

Step 520

Judgement is made to determine if the remaining number of tracks has reached a predetermined number. If it has reached it, step 521 is executed. If it has not reached it, step 507 is returned to and steps 507 to 520 are again performed.

Step 521

Switches 304 and 305 respectively connected to predetermined voltages V and $-V$ are turned on for a certain time so that the objective lens actuator may perform acceleration or deceleration of the speed of movement of the beam spot.

For detection of the speed, as mentioned above, the number of tracks of movement may be sampled every 250 $\mu$s or the speed of movement may be found for each track. The switching of the beam spot movement by the control of the lens actuator may be performed at a remaining number of tracks of about 30. The movement by the optical head drive motor 9 is switched to movement of the beam spot by the objective lens actuator so as to move the beam spot with a high precision near the target track.

In the above way, by counting the tracks, the resolution becomes temporal resolution of the timer 82 for measuring the intervals of the TES zero crossings. For example, if clocks of 500 ns are counted, a temporal resolution of 1 $\mu$s is obtained.

Step 522

The routine is ended.

In the above step 516, $s_0$ and $s_3$ were found using $s_0 = s_{-1} (1 + (at^2/p))$ and $s_3 = s_2 (1 + (a't^2/p))$, but the approximations of $s_0 \approx s_{-1}$ and $s_3 \approx s_2$ may also be made.

Above, the present invention was explained in accordance with embodiments. In the present invention, when the amount of tracks of movement reaches a predetermined number, control of the objective lens actuator is switched to, but the present invention is not limited to this. Further, in the present embodiments, speed control of steps 507 to 520 was performed from the acceleration at the start of the track movement, but the acceleration at the start of the track movement performs speed control by only the acceleration speed determined in advance and stored in the table 801 and the additional current at the time of acceleration stored in the table 803. The speed control of steps 507 to 520 may be performed only during deceleration.

Further, when the beam spot is moving at a high speed, speed control may be performed only by the track counter as in the past, without finding the remainder of the above tracks, and when it is moving at a low speed, that is, when the resolution by the sampling time falls, speed control may be performed finding the remainder.

As shown above, the present invention includes various modifications in accordance with the gist of the invention and does not exclude the same.

What is claimed is:

1. A method for measuring the speed of movement during beam track movement in an optical memory apparatus which moves a beam spot on a rotating optical recording medium, comprising steps of:

receiving a beam spot from the optical recording medium and detecting when the beam spot crosses a track;

counting the number of the detected track crossings of the beam spot within a predetermined time interval defined by a sample trigger signal;

measuring a track crossing interval based on the counted number of the detected track crossings;

counting a remainder time from the time when a track crossing is detected to the end of the predetermined time interval; and measuring the speed of movement of the beam spot based on the number of tracks counted, the track crossing interval, and the remainder time.

2. A method for measuring the speed of movement during beam track movement in an optical memory apparatus which moves a beam spot on a rotating optical recording medium, comprising steps of:

receiving a beam spot from the optical recording medium and detecting when the beam spot crosses a track;

measuring a first track crossing interval based on a number of times it is detected that the beam spot crosses a track during a first predetermined time interval defined by a sample trigger signal and measuring a first remainder time from the time when a track crossing is detected to the end of the first predetermined time interval;

counting a number of detected track crossings in a second predetermined time interval after the first predetermined time interval, measuring a second track crossing interval based on the number of times detected, and measuring a second remainder time when a track crossing is detected to the end of the second predetermined time interval, and measuring the speed of movement of the beam spot based on the first track crossing interval, the first remainder time, the number of tracks for which crossings are detected, the second track crossing interval, and the second remainder time.

3. A method for measuring the speed of movement during beam track movement in an optical memory apparatus according to claim 1 further comprising a step of controlling the speed of movement of the beam spot based on the amount of movement measured in said step for measuring the amount of movement of the beam spot.

4. An apparatus for measuring the speed of movement during beam track movement in an optical memory apparatus having a beam movement means for moving a beam spot on a rotating optical recording medium, comprising:

track crossing detection means for receiving a beam spot from the optical recording medium and detecting when the beam spot crosses a track;

track crossing counting means for counting the number of track crossings of the beam spot detected by the track crossing detection means during a predetermined time interval defined by a sample trigger signal;

track crossing interval measurement means for measuring a track crossing interval for crossing a track as detected by said track crossing detection means;

remainder measurement means for measuring a remainder time from when a track crossing is detected to the end of the predetermined time interval based on the output of said track crossing detection means; and beam movement speed measurement means for measuring the amount of beam movement in the predetermined time interval based on the number of tracks counted by said track crossing counting means, the track crossing interval measured by said track crossing interval measurement means, and the remainder time measured by said remainder measurement means.

5. An apparatus for measuring the speed of movement during beam track movement in an optical memory apparatus according to claim 4, wherein the predetermined time interval includes first and second predetermined time intervals, and wherein said beam movement speed measurement means measures, from the track crossing interval measured by said track crossing interval measurement means and the remainder time measured by said remainder measurement means, during the first predetermined time interval determined in advance and a number of tracks counted by said track crossing counting means, the track crossing interval measured by said track crossing interval measurement means, and the remainder time measured by said remainder measurement means during a second predetermined time interval after the first predetermined time interval, the amount of movement of the beam spot within the second predetermined time interval.

6. An apparatus for measuring the speed of movement during beam spot track movement in an optical memory apparatus according to claim 4, further comprising beam movement means control means for driving said beam movement means in accordance with the speed of movement determined by said beam movement speed measurement means.

7. An apparatus for measuring the speed of movement during beam track movement in an optical memory apparatus according to claim 2, further comprising a step of controlling the speed of movement of the beam spot based on the amount of movement measured in said step for measuring the amount of movement of the beam spot.

8. An apparatus for measuring the speed of movement during beam spot track movement in an optical memory apparatus according to claim 5, further comprising beam movement means control means for driving the beam movement means in accordance with the speed of movement determined by said beam movement speed measurement means.

* * * * *

UNITED STATES PATENT AND TRADEMARK OFFICE
CERTIFICATE OF CORRECTION

PATENT NO. : 5,228,019
DATED : JULY 13, 1993
INVENTOR(S) : SHIGENORI YANAGI

It is certified that error appears in the above-indentified patent and that said Letters Patent is hereby corrected as shown below:

TITLE PAGE [56] ABSTRACT, line 4, "medium, a" should be --medium. A--.

Col. 2, line 14, "formed" should be --form a--; and

"diagrams" should be --diagram--.

Col. 4, line 38, "a = 226332" should be -- a = 22 x 2--.

Signed and Sealed this

Twenty-sixth Day of April, 1994

Attest:

BRUCE LEHMAN

Attesting Officer     Commissioner of Patents and Trademarks